(12) United States Patent
Narita

(10) Patent No.: US 12,050,815 B2
(45) Date of Patent: Jul. 30, 2024

(54) NON-TRANSITORY STORAGE MEDIUM STORING SUPPORTING PROGRAM EXECUTABLE BY COMPUTER OF INFORMATION PROCESSING APPARATUS

(71) Applicant: Brother Kogyo Kabushiki Kaisha, Nagoya (JP)

(72) Inventor: Kenju Narita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/156,438

(22) Filed: Jan. 19, 2023

(65) Prior Publication Data

US 2023/0236770 A1  Jul. 27, 2023

(30) Foreign Application Priority Data

Jan. 21, 2022  (JP) ............................. 2022-007608

(51) Int. Cl.
G06F 3/12  (2006.01)

(52) U.S. Cl.
CPC ............ G06F 3/1203 (2013.01); G06F 3/121 (2013.01); G06F 3/1253 (2013.01);
(Continued)

(58) Field of Classification Search
CPC ...... G06F 3/1203; G06F 3/121; G06F 3/1253; G06F 3/1273; G06F 3/1287; G06F 3/1293

See application file for complete search history.

(56) References Cited

U.S. PATENT DOCUMENTS

2018/0065477 A1    3/2018  Thompson
2019/0312986 A1*  10/2019  Tachibana .......... H04N 1/32657
(Continued)

FOREIGN PATENT DOCUMENTS

JP    2006-323508 A    11/2006
JP    2007-140816 A     6/2007
(Continued)

OTHER PUBLICATIONS

International Search Report dated Mar. 14, 2023 (Application No. PCT/JP2023/001131).

(Continued)

*Primary Examiner* — John R Wallace
(74) *Attorney, Agent, or Firm* — Merchant & Gould P.C.

(57) ABSTRACT

A non-transitory storage medium stores a supporting program executable by a computer of an information processing apparatus. The supporting program is configured to support a printing program of an operating system of the information processing apparatus. The printing program of the operating system is configured to process data so as to display a print setting screen on a display of the information processing apparatus, Service information which is information related to a service applicable to the external printer is stored in the external printer. The supporting program causes the information processing apparatus to obtaining the service information, generating, based on the obtained service information, notification data indicating a notifying image to a user, and displaying the notifying image on the print setting screen displayed on the display of the information processing apparatus by outputting the generated notification data to the printing program of the operating system.

13 Claims, 8 Drawing Sheets

(52) U.S. Cl.
CPC .......... *G06F 3/1273* (2013.01); *G06F 3/1287* (2013.01); *G06F 3/1293* (2013.01)

(56) References Cited

U.S. PATENT DOCUMENTS

| | | |
|---|---|---|
| 2020/0310720 A1 | 10/2020 | Kakitsuba |
| 2020/0404108 A1* | 12/2020 | Saito ..................... G06F 3/1287 |
| 2021/0216254 A1 | 7/2021 | Hosomizo |
| 2022/0417371 A1* | 12/2022 | Nagao ................ H04N 1/00344 |
| 2023/0208989 A1* | 6/2023 | Kanamori ............ H04N 1/4426 |
| | | 358/1.14 |

FOREIGN PATENT DOCUMENTS

| | | |
|---|---|---|
| JP | 2008-065460 A | 3/2008 |
| JP | 2011-238155 A | 11/2011 |
| JP | 2013-257694 A | 12/2013 |
| JP | 2018-062134 A | 4/2018 |
| JP | 2020-160989 A | 10/2020 |
| JP | 2021-093079 A | 6/2021 |

OTHER PUBLICATIONS

English translation of the International Preliminary Report on Patentability (Chapter I) dated Mar. 14, 2023 (Application No. PCT/JP2023/001131).

* cited by examiner

NON-TRANSITORY STORAGE MEDIUM STORING SUPPORTING PROGRAM EXECUTABLE BY COMPUTER OF INFORMATION PROCESSING APPARATUS

REFERENCE TO RELATED APPLICATIONS

The present application claims priority from Japanese Patent Application No. 2022-007608, which was filed on Jan. 21, 2022, the disclosure of which is herein incorporated by reference in its entirety.

BACKGROUND ART

The following disclosure relates to a non-transitory storage medium storing a program executable by a computer of an information processing apparatus.

There has been known a conventional technique for displaying, by using a printer driver, information of services applicable to an external printer. For example, in the conventional technique, the printer driver obtains positional information of the external printer and obtains a URL corresponding to the positional information. As a result, a dialogue for ordering consumables is displayed on a browser's screen based on the obtained URL.

DESCRIPTION

A technique in which a general-purpose printing program installed in a standard operating system, which is the OS that comes standard with the general-purpose printing program, controls the external printer without using the printer driver has been commercialized recently. In this technique, when the OS detects the external printer, the OS establishes an association between the general-purpose printing program installed in the OS and the external printer. After that, in a case where an instruction for a print execution to the external printer is received, printing by the general-purpose printing program installed in the OS becomes available without using the printer driver.

In an information processing apparatus using the general-purpose printing program installed in the OS, however, there has not been known a configuration in which information of a service individually applied to the external printer such as the printer driver is displayed. Accordingly, there is still room for improvement of a displaying technique in an environment in which the general-purpose printing program is used.

In one aspect of the disclosure, a non-transitory storage medium stores a supporting program executable by a computer of an information processing apparatus. The supporting program is configured to support a printing program of an operating system of the information processing apparatus, and the supporting program conforms to an external printer connected to the information processing apparatus. The printing program of the operating system is configured to process data so as to display a print setting screen on a display of the information processing apparatus. Service information which is information related to a service applicable to the external printer is stored in the external printer. When executed by the computer, the supporting program causes the information processing apparatus to execute, when being requested from the printing program of the operating system for processing in response to selection of the external printer, obtaining the service information stored in the external printer, generating, based on the obtained service information, notification data indicating a notifying image to a user, and displaying the notifying image on the print setting screen displayed on the display of the information processing apparatus by outputting the generated notification data to the printing program of the operating system.

The objects, features, advantages, and technical and industrial significance of the present disclosure will be better understood by reading the following detailed description of the embodiments, when considered in connection with the accompanying drawings, in which.

There will be described in details below a personal computer 1, which may be hereinafter referred to as the PC 1, using a supporting program of the present embodiment, with reference to the drawings. The present disclosure discloses the supporting program executed in the PC 1.

Figure 1:
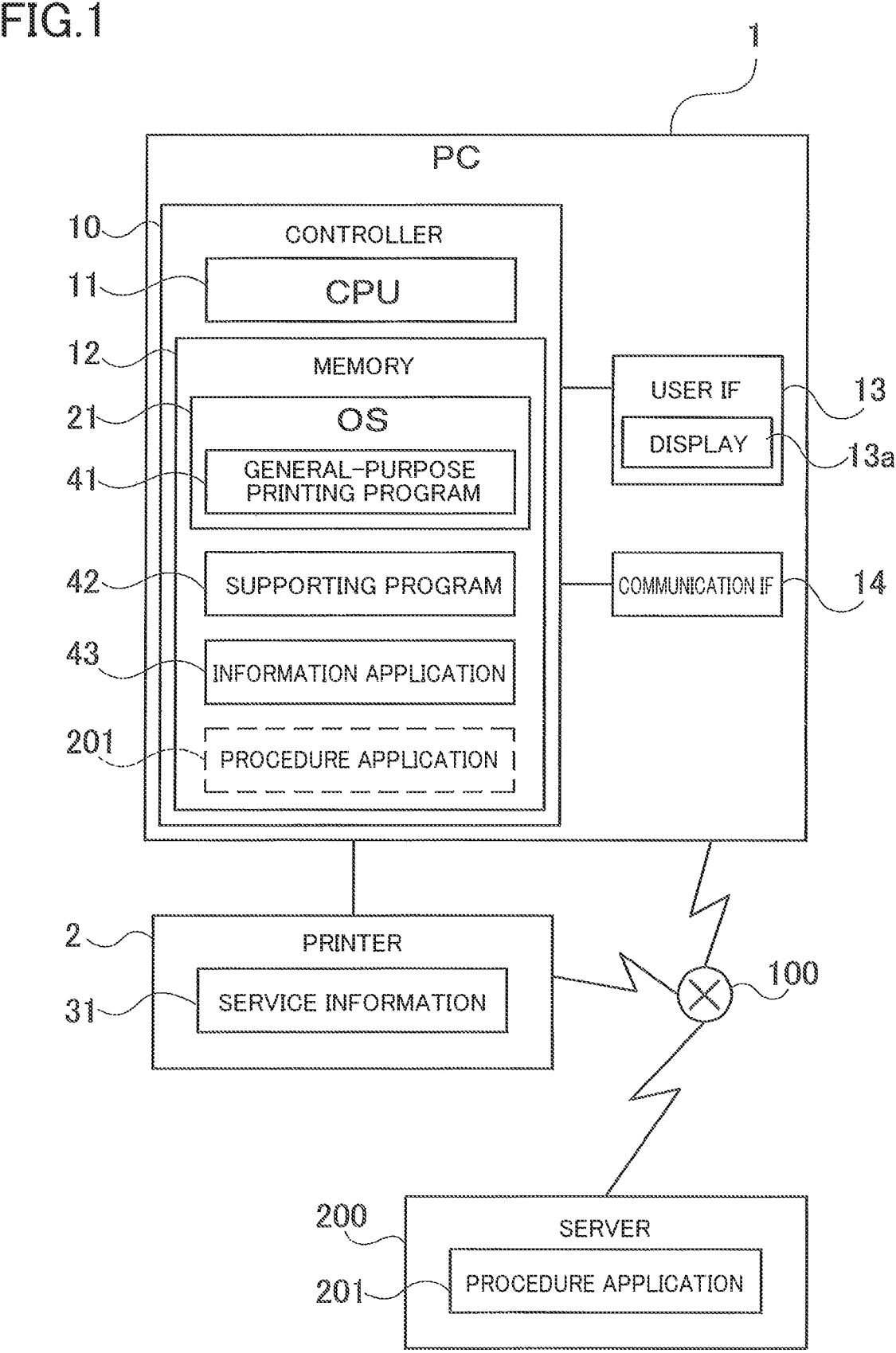
FIG. 1 is a block diagram illustrating an outline of an electric configuration of a PC.

As illustrated in FIG. 1, the PC 1 of the present embodiment includes a controller 10 having a CPU 11 and a memory 12. The PC 1 is an example of an information processing apparatus. The CPU 11 is an example of a computer. Moreover, the PC 1 includes a user interface 13, which may be hereinafter referred to as the user IF 13, and a communication interface 14, which may be hereinafter referred to as the communication IF 14. The user IF 13 and the communication IF 14 are electrically connected to the controller 10. It is noted that the controller 10 in FIG. 1 is a general term for hardware and software used in a control of the PC 1, and the controller 10 is not limited to a single piece of hardware actually existing in the PC 1.

The CPU 11 executes various kinds of processes in accordance with various kinds of programs read from the memory 12 or based on operations by a user. The various kinds of programs and various kinds of data are stored in the memory 12. The memory 12 is also used as a work area at which the various kinds of processes are executed. A buffer in the CPU 11 is also an example of a memory. It is noted that the example of the memory 12 is not limited to a ROM, a RAM, a HDD and so on each built into the PC 1, and the example of the memory 12 may be a storage medium readable and writable by the CPU 11 such as a CD-ROM, a DVD-ROM.

The user IF 13 includes the display 13a which is hardware configured to display a screen for notifying information to the user, and hardware that receives operations by the user. It is noted that the user IF 13 may be a combination of the display 13a capable of displaying information and a mouse, a keyboard and so on each having a function of receiving an input. The user IF 13 may be a touch panel having the display 13a and a function of receiving an input.

The communication IF 14 includes hardware configured to communicate with an external device such as a printer 2. Communication standard of the communication IF 14 includes Ethernet, Wi-Fi, USB and so on. Each of Ethernet, Wi-Fi, USB is a registered trademark. The PC 1 may be connectable to the Internet 100 via the communication IF 14. Moreover, the PC 1 may include a plurality of communication IFs 14 respectively conforming to a plurality of kinds of the communication standard.

As illustrated in FIG. 1, an operating system 21 including a general-purpose printing program 41, a supporting program 42 and various kinds of application programs, which may be hereinafter referred to as the application, are stored in the memory 12 of the PC 1. The operating system 21 may be hereinafter referred to as the OS 21. The OS 21 is, for example, Windows, macOS, Linux, iOS or Android. Each of Windows, macOS, Linux, iOS and Android is a registered trademark. The general-purpose printing program 41 is an example of a printing program. The supporting program 42 is an example of a supporting program.

As various kinds of applications, for example, an information application 43 is installed on the PC 1 of the present embodiment. The information application 43 is, for example, a map application, a calendar application, or a browser application. The information application 43 has a function of causing the PC to display various kinds of information on the display 13a in accordance with requests from the user. The information application 43 is an example of an application program. It is noted that the information application 43 itself may not include a function of causing the printer 2 to print the displayed information.

The general-purpose printing program 41 is a standard program of the OS 21 provided together with the OS 21, and the general-purpose printing program 41 has a function of causing the printer 2 and so on to print information which is displayed on the display 13a by the information application 43 and so on. The general-purpose printing program 41 of the present embodiment is a program having a function of generating intermediate image data based on image data of an image to be printed. The general-purpose printing program 41 supports functions commonly available for various kinds of models of printers supplied by various vendors. Different from a specific printer driver of each of the various kinds of models of the printers, the general-purpose printing program 41 does not support all of inherent functions of each of the various kinds of models of printers, and the general-purpose printing program 41 only supports general-purpose functions of each of the various kinds of models of the printers.

The supporting program 42 is a program or a program group configured to execute processes based on an instruction from the OS 21, and the execution by the supporting program 42 is accompanied by execution of processes by the general-purpose printing program 41. The supporting program 42 is a program configured to support a control of hardware which is to be controlled. The supporting program 42 of the present embodiment conforms to the model of the printer 2 connected to the PC 1, and, for example, the supporting program 42 is activated by the general-purpose printing program 41 in response to receipt of an instruction for causing the printer 2 to print by using the general-purpose printing program 41. The supporting program 42 is called as a print supporting application, the abbreviated name of which is PSA, or a hardware supporting application, the abbreviated name of which is HSA, for example.

It is noted that the supporting program 42 may be a combination of a plurality of programs each receiving an execution order, and the supporting program 42 may be a single program capable of executing different processes in accordance with different orders. Moreover, the supporting program 42 may be a program supplied for each of various types of the printers by the vendor of each of the printers. For example, each of a supporting program for an ink-jet printer and a supporting program for a laser printer may be provided. The supporting program is not limited to be provided for each of the various types of the printer, that is, a supporting program may be provided for each of the various kinds of models of the printers or may be provided for each of a plurality of series of the various kinds of models of the printers.

For example, in a case where a new printer is connected to the PC 1, the OS 21 of the PC 1 can download a proper supporting program from a server and so on and install the downloaded supporting program on the PC 1 in accordance with a type and a model of the connected printer. The OS 21 associates identification information of the installed supporting program 42 with information of the newly connected printer and stores the associated identification information into the memory 12.

As illustrated in FIG. 1, the PC 1 of the present embodiment is connected to the printer 2. The printer 2 is a device having at least a print function and a communication function. The printer 2 of the present embodiment stores service information 31. The service information 31 will be described below. Moreover, the printer 2 is capable of communicating with the Internet 100, and is capable of communicating with a server 200 via the Internet 100.

The server 200 is, for example, a cloud server managed by the vendor of the printer 2, and the server 200 stores information related to various kinds of services provided by the vendor. The various kinds of services provided by the vendor includes, for example, a time-limited service of use of the printer on the subscription type plan, a limited-number-printing service of the use of the printer on the prepaid type plan, and a service of use of various kinds of expanded functions which are set to be unselectable for the printer 2 at the time of shipment of the printer 2.

"The service" in the present disclosure is a service for which procedures for a contract are necessary at the time of start of the printer or after installation of the printer, and "the service" in the present disclosure is a service cannot be used without going through the procedures for entering into the contract. It is noted that the various kinds of services can be used on a chargeable basis or on a free of charge basis. Moreover, the various kinds of services applicable to the printers may be respectively different from one another among the models of the printers.

The information stored in the server 200 includes, for example, information related to services and consumables applicable to each of the models of the printers, information related to usage conditions of each of the services of the printer, and information related to the procedures for making the service valid. For example, in a case where the procedures for making the service of each of the printers valid are done, information related to the procedures is transmitted to the server 200. The server 200 stores, as the usage condition of the service, the information of the valid service associated with the identification information of the printer. In a case where limitations of the valid service such as a valid usable term of the service or a usable number of printings of the printer are set, the server 200 suitably updates the usage conditions in response to receipt of a usage notification from the printer.

Moreover, a procedure application 201 configured to perform procedures to make the various kinds of services valid is installed on the server 200. The procedure application 201 is an example of a particular application program. The procedure application 201 is provided by a request from the PC 1 and so on. When the procedure application 201 is installed on the requesting PC 1 and so on, the procedure application 201 becomes available in the PC 1 and so on.

Next, there will be described printing steps, including operations of the supporting program 42 of the present embodiment, of each of the general-purpose printing program 41, the supporting program 42 and the information application 43 performed in a case where printing is selected in the information application 43, with reference to a view of a sequence illustrated in FIG. 2. It is noted that the view of the sequence in FIG. 2 and views of other sequences, which will be described below, illustrates operations performed in a case where the supporting program 42 conforming to the printer 2 has been installed on the PC 1.

It is noted that each of steps of processes in the present embodiment and steps in the flowcharts basically indicate processes performed by the CPU 11 in accordance with orders described in the program such as the supporting program 42. The process performed by the CPU 11 includes a hardware control using an API of the OS 21. In the present disclosure, there will be described operations of each of the programs, and a detailed explanation of the OS 21 is dispensed with. Moreover, "obtainment" is used as a concept not requiring a request.

Figure 3:
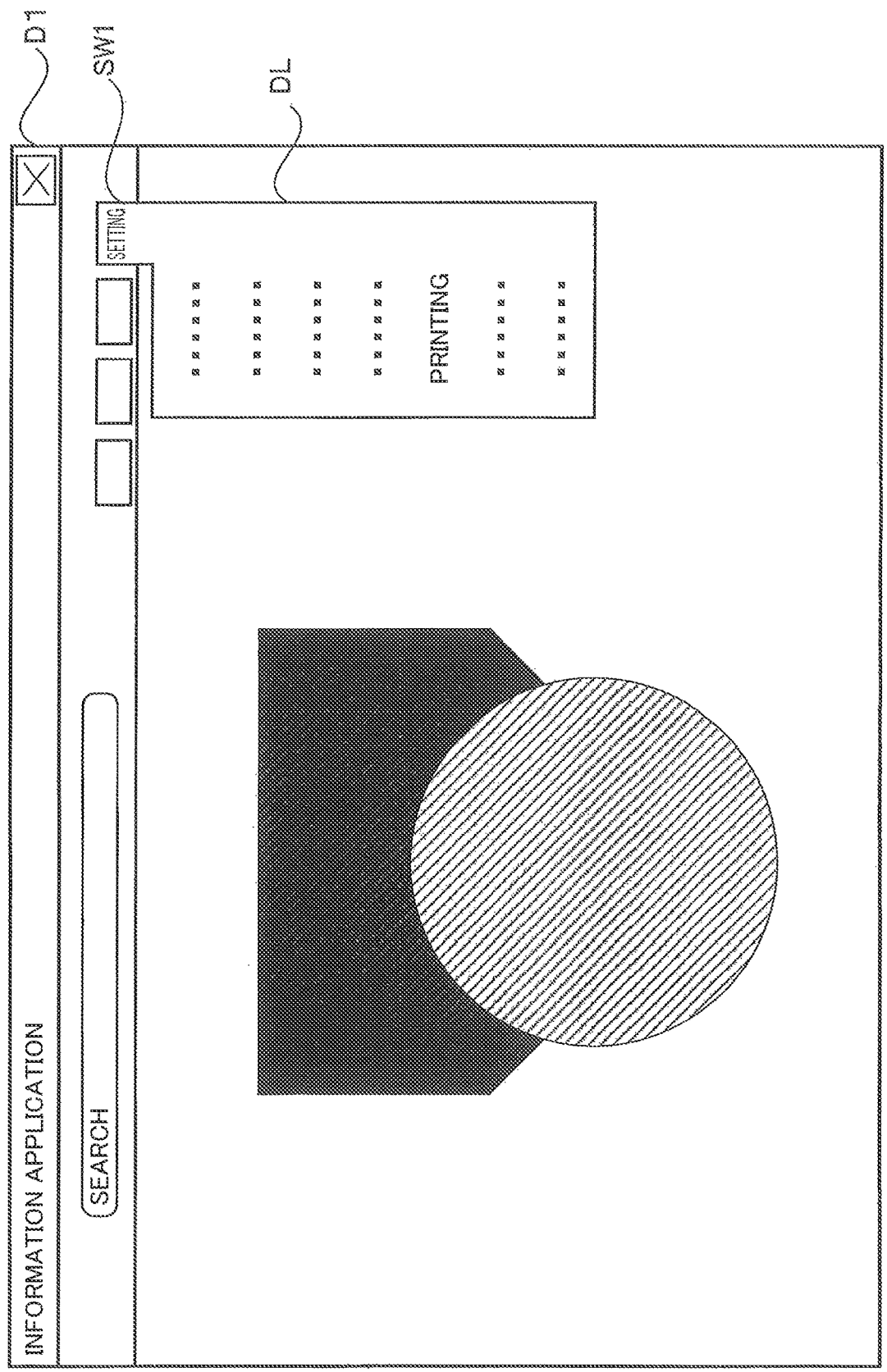
FIG. 3 is an explanatory view illustrating an example of an information screen.

At the beginning of the steps, the user activates the information application 43 at A01. At A02, the information application 43 causes the PC 1 to display an information screen including various kinds of information on the display 13a in accordance with an instruction from the user. In a case where the user wishes to print an image of the information screen which is being displayed, the user selects printing on the information screen at A03. As illustrated in FIG. 3, for example, an information screen D1 includes a setting button SW1. When the setting button SW1 is pushed by the operation of the user, a pull-down menu DL including "printing" is displayed, as illustrated in FIG. 3. When "printing" in the pull-down menu DL is selected by the user, the information application 43 passes a display request and data of the information screen to the general-purpose printing program 41 of the OS 21 at A04.

Figure 4:
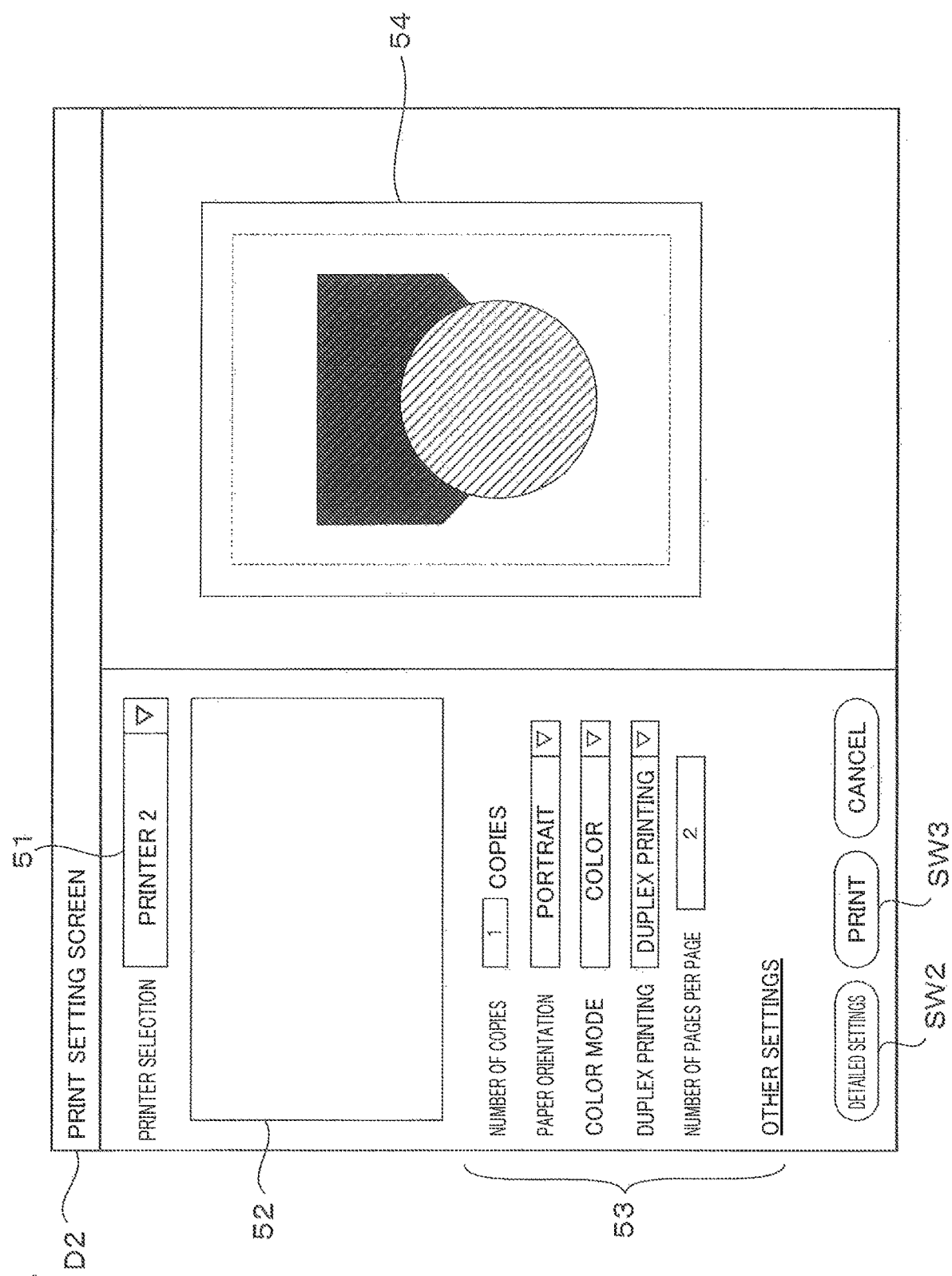
FIG. 4 is an explanatory view illustrating an example of a print setting screen.

The general-purpose printing program 41 causes the PC to display a print setting screen on the display 13a in accordance with the transmitted request at A06. The print setting screen is a screen configured to receive the instruction for setting the print setting and an instruction for a print execution. As illustrated in FIG. 4, for example, the print-setting screen D2 includes a printer selecting column 51 that receives a selection of the printer, a notifying area 52 that displays a notifying image, a print setting column 53 that receives various kinds of designations of the print settings, a preview area 54 that illustrates an image of the information screen which is to be printed, a detailed setting button SW2 that receives an instruction for setting detailed print settings, and a printing button SW3 that receives the instruction for the print execution. The notifying image displayed on the notifying area 52 is an image indicating a notification to the user. The general-purpose printing program 41 is able to process data for displaying the print-setting screen D2.

At A07, the user can select the printer by performing the operation to the printer selecting column 51 on the print-setting screen D2 which is being displayed. In a case where the selected printer is the printer 2, the general-purpose printing program 41 activates the supporting program 42 corresponding to the printer 2 and transmits a request for a process corresponding to the selection of the printer at A08. At A08, the general-purpose printing program 41 passes, to the supporting program 42, information related to the selected printer and information related to the print setting being set at the time of the selection of the printer 2.

It is noted that, in a case where the printer 2 is set to the printer usually used in the OS 21, for example as illustrated in FIG. 4, the general-purpose printing program 41 displays, at A06, the print-setting screen D2 in a state in which the printer 2 is being selected, and the general-purpose printing program 41 activates the supporting program 42, at A08. That is, the printer 2 is automatically selected by the OS 21, and the general-purpose printing program 41 performs the process of A08 based on the information of the selected printer 2. In this case, the user does not need to perform the operation of A07.

It is noted that the information application 43 may cause the PC 1 to display the print-setting screen D2 on the display 13a instead of displaying the print-setting screen D2 by the general-purpose printing program 41. In this case, the information application 43 activates the general-purpose printing program 41 in response to the selection of printing at A03, obtains data of an image for displaying the image on the print-setting screen D2 from the general-purpose printing program 41, and causes the PC 1 to display the print-setting screen D2 on the display 13a. Then, the information application 43 passes the information related to the selected printer 2 to the general-purpose printing program 41 in accordance with a state in which the printer 2 is being selected or a state in which the printer 2 is selected at A07. As a result of this, the general-purpose printing program 41 activates the supporting program 42 conforming to the printer 2 at A08.

At A11, the supporting program 42 transmits to the OS 21 a request for capability information of the printer 2 in response to the activation of the supporting program 42. The OS 21 transmits an obtaining request for obtaining the capability information to the printer 2 in response to receipt of the request from the supporting program 42, and the OS 21 obtains the capability information from the printer 2 at A12. The OS 21 passes the capability information obtained from the printer 2 to the supporting program 42 at A13.

The OS 21 communicates with the printer 2 over communication in accordance with, for example, the IPP (Internet Printing Protocol). It is noted that the supporting program 42 may directly obtain, from the printer 2, the capability information by using, for example, MIB (Management Information Base), instead of transmitting the request to the OS 21.

The capability information obtained from the printer 2 includes, for example, information of parameters settable as the print setting, status information, information related to a remaining amount of consumables, information related to trays mounted on the printer 2, sheet information related to sheets set on each of the trays, and information related to applicable printing resolutions. Moreover, the printer 2 may have functions, of printing based on the processed data of images processed based on the received print job, such as a function of page-integrating printing such as N in 1, a function of composite printing such as watermarking and a function of saving printing for saving coloring agents. In a case where there is the function of the image processing executable by the printer 2, the printer 2 may pass the information related to the function, as the capability information, to the OS 21.

Moreover, the printer 2 of the present embodiment passes the capability information including the service information 31 to the OS 21 at A12. The supporting program 42 can obtain the information related to the service applicable to the printer 2 based on the service information 31 included in the capability information received from the OS 21. In this case, each of the processes at A12 and A13 is an example of an obtaining process.

It is noted that the service information 31 may be information separately obtained from the capability information. In this case, the supporting program 42 may transmit the request for obtaining the service information 31 to the OS 21 aside from the process at A11, and the supporting program 42 may obtain the service information 31 by directly communicating with the printer 2.

The service information 31 includes, for example, information indicating kinds of services applicable to the printer 2 and information indicating whether each of the services is currently valid or not. Moreover, in a case where there are valid services for the printer 2, the service information 31 includes, for example, information related to a date and time of a start of usage of each of the valid services, a total number of printings performed by using each of the valid services, limiting information such as a valid term or a usable number of printings of each of the valid services, and remaining information such as a remaining term or a remaining number of usable printings of each of the valid services. Moreover, the service information 31 includes, for example, information corresponding to a usage amount of consumables based on the total number of printings and the total number of copies and so on. It is noted that, in a case where there is no service applicable to the printer 2, the printer 2 may stores, as the service information 31, information indicating there is no service applicable to the printer 2.

The service information 31 may further include, for example, information related to the printer 2 itself, information related to a usage status of the printer 2, information related to a remaining amount of consumables mounted on the printer 2, and information related to a timing of an exchange of the consumables and a method of the exchange of the consumables. The service information 31 obtainable from the printer 2 may include not only the information stored in the printer 2, but also information obtainable by a request from the printer 2 to the server 200.

At A14, the supporting program 42 stores the capability information notified at A13 from the OS 21 into a predetermined area available to the supporting program 42 in the memory 12. It is noted that, in a case where the capability information has already been stored in the memory 12, the supporting program 42 overwrites the previously stored capability information with the currently obtained capability information.

At A21, the supporting program 42 executes a notifying data generating process based on the capability information notified at A13. The notifying data generating process is a process in which notifying data indicating the notifying image which is displayed on the notifying area 52 in the print-setting screen D2 is generated. The notifying image displayed on the notifying area 52 may include, for example, an object to which a text, a still picture, a movie, or a link in which a URL is embedded are placed, and the notifying image may include a combination of the text, the still picture, the movie, and the link. A displaying manner of the object may be a text style, or a button or a banner style. The details of the notifying data generating process will be described below.

Moreover, the supporting program 42, at A22, passes, to the general-purpose printing program 41, display information including information related to print setting values based on the generated notifying data and the capability information. Then, the supporting program 42 ends the process. At A23, the general-purpose printing program 41 causes the PC 1 to display, based on the displaying information received from the supporting program 42, the notifying image on the notifying area 52 in the print-setting screen D2 which is being displayed on the display 13a. At A23, information based on the capability information of the printer 2 is displayed on the print setting column 53 as an initial value of each of the print settings, in addition to the notifying image displayed on the notifying area 52 based on the notifying data. The process of A23 is an example of a displaying process. It is noted that, in a case where the information application 43 is configured to display the print-setting screen D2, at A23, the information application 43 causes the PC 1 to display the notifying image on the notifying area 52 in response to receipt of the notifying data.

It is noted that, in an example in FIG. 4, the print-setting screen D2 including the single notifying area 52 is described, however, arrangements, shapes, sizes and a number of the notifying areas 52 are not limited to the example in FIG. 4. The supporting program 42 may obtain the information to be displayed on the notifying area 52 from the general-purpose printing program 41, and may determine the notifying data to be displayed on the notifying area 52 based on the obtained information. For example, in a case where there are a plurality of areas each capable of displaying the notifying area 52 and the supporting program 42 can designate any of the plurality of areas each on which the notifying image is displayed, the supporting program 42 may pass, to the general-purpose printing program 41, the notifying data including information designating any of the plurality of areas each on which the notifying image is displayed. Moreover, in a case where a size of the notifying area 52 can be selected, the supporting program 42 may pass information designating the size of the notifying area 52 to the general-purpose printing program 41.

Figure 5:
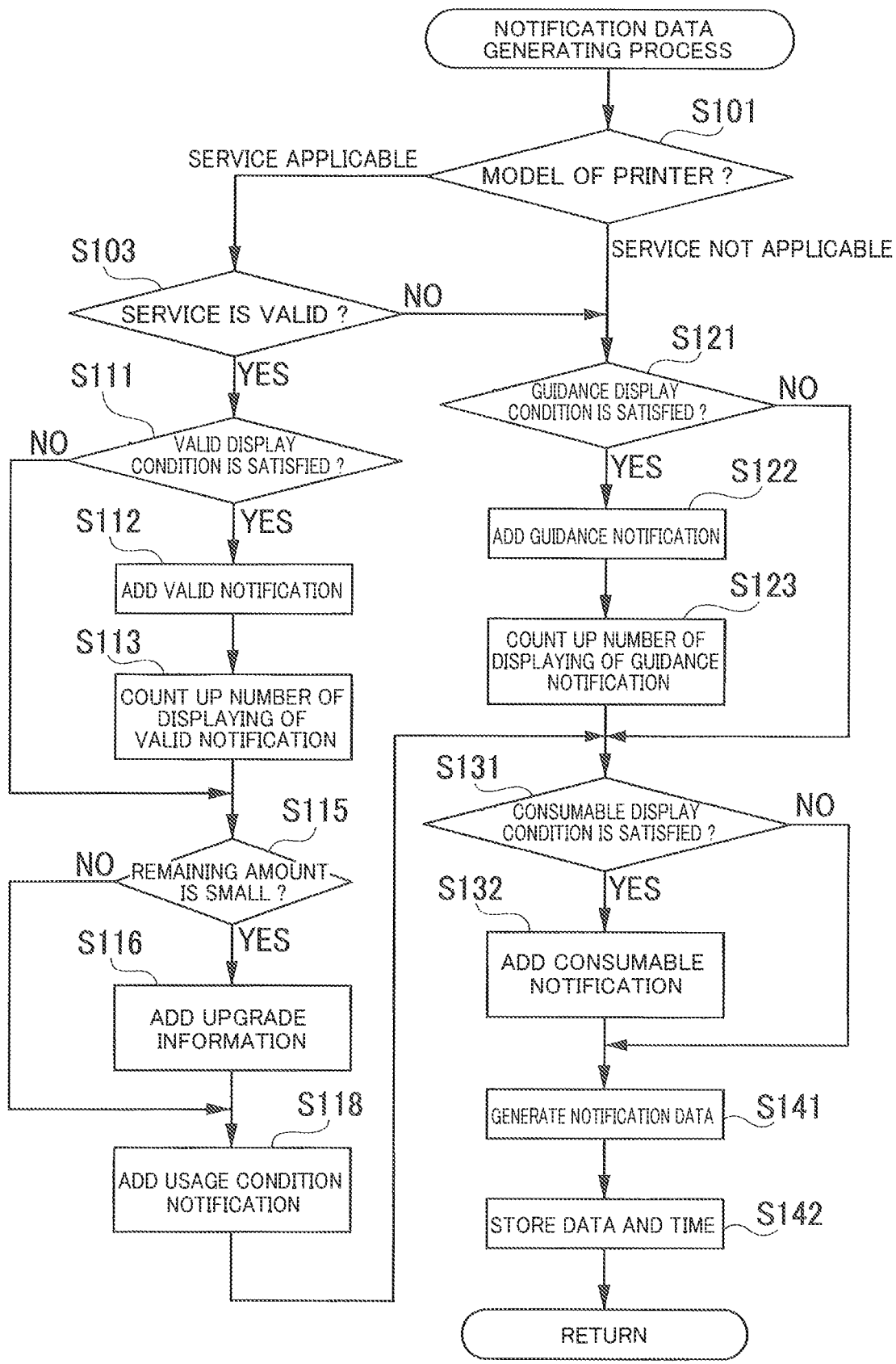
FIG. 5 is a flowchart illustrating steps of a notifying data generating process.

Next, there will be described steps of the notifying data generating process executed at A21 with reference to a flowchart in FIG. 5. The notifying data generating process is executed by the CPU 11 of the PC 1 based on a description of the supporting program 42.

Figure 2:
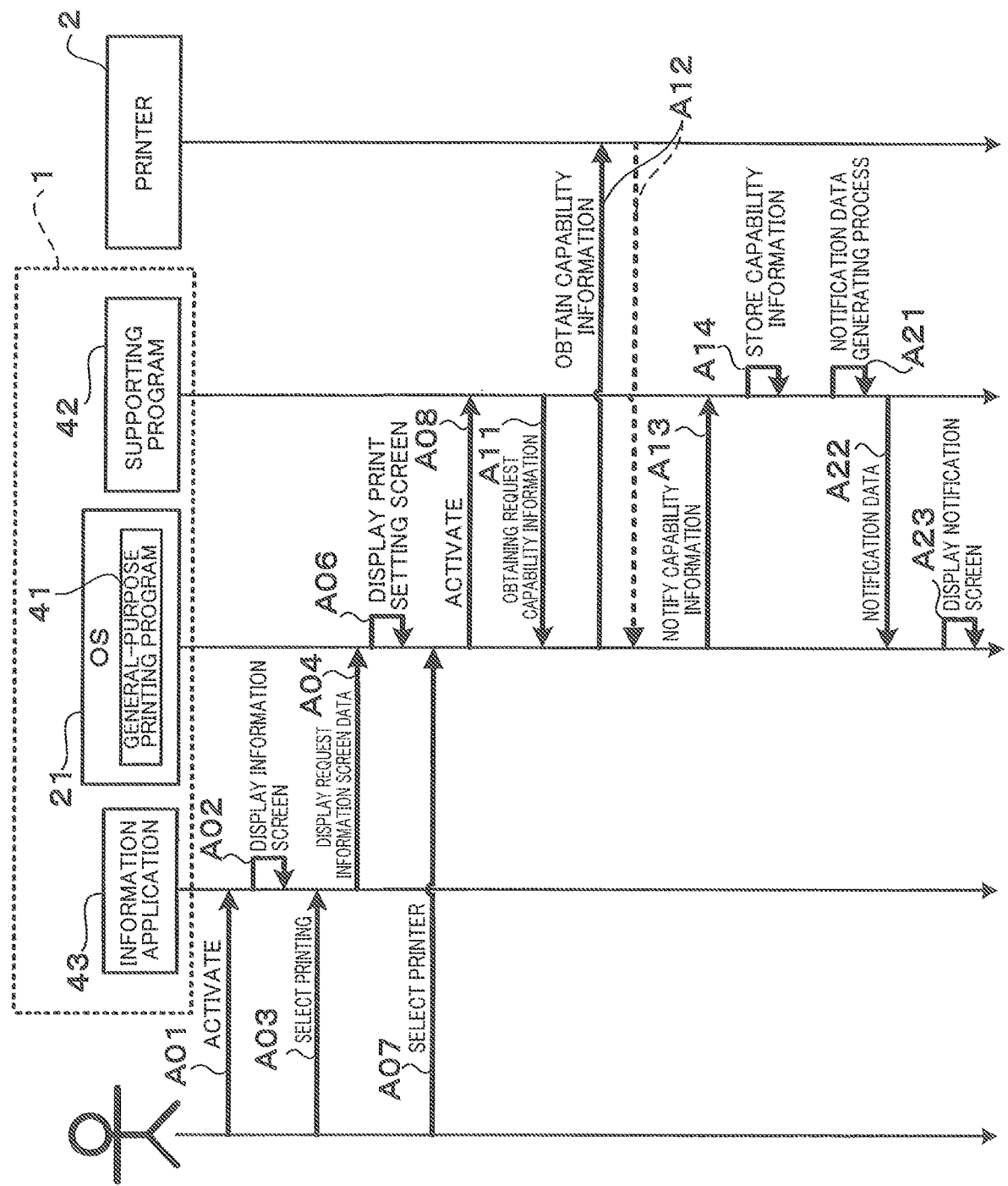
FIG. 2 is a view illustrating a sequence of steps performed in a case where printing is selected.

In the notifying data generating process, at S101, the CPU 11 determines, first, whether the printer 2 is a model to which the various kinds of services are applicable or not based on the capability information obtained at A13 in FIG. 2 and the service information 31. When it is determined that the printer 2 is the model to which the various kinds of services are applicable (S101: service applicable), the CPU 11 determines whether the corresponding services are valid or not at S103.

When it is determined that any one of the corresponding services is valid (S103:YES), the CPU 11 determines whether a valid displaying condition is satisfied or not at S111. The valid displaying condition is a condition for determining whether a valid notification that indicates information related to the valid service is to be included in the notifying image or not. The valid displaying condition is determined based on, for example, a number of printings performed by using the service, a number of displays of the valid notification, a period of time elapsed from the previous displaying of the valid notification, and a period of time elapsed from the start of the service. The valid notification includes information indicating that the service is currently used.

The supporting program 42 can obtain the information, of each of the various services, indicating the number of printings performed by using the service based on the service information 31 of the printer 2. Then, in a case where the number of printings performed by using the service, which is to be displayed, is greater than a predetermined limited number of printings, the CPU 11 determines that the valid displaying condition is not satisfied at S111. The information indicating the number of printings included in the service information 31 is an example of a total number of printings, and the predetermined limited number of printings is an example of a first value.

Moreover, when the information of the service is displayed, the supporting program 42 counts up the number of displays and stores the counted number of displays at S113 which will be described below. Then, when it is determined that the number of displays of the valid notification of the service, which is to be displayed, is greater than a predetermined limited number of displays, the CPU 11 determines that the valid displaying condition is not satisfied at S111. The number of displays is an example of a total number of displays, and the predetermined limited number of displays is an example of a second value.

Moreover, when information of the service is displayed, the supporting program 42 stores a date and time of displaying at S142 which will be described below. When it is determined, based on the last-stored displaying time, that a period of time elapsed from the timing when the valid notification was last displayed is equal to or less than a predetermined interval time, the CPU 11 determines that the valid displaying condition is not satisfied at S111. The predetermined interval time is an example of a first period of time. It is noted that, in a case where the date and time of displaying is not stored, the CPU 11 determines that the period of time elapsed from the date and time of displaying is greater than the predetermined interval time.

Moreover, the supporting program 42 can obtain information indicating a date and time of a start of usage of each of the kinds of the services based on the service information 31 of the printer 2. Then, in a case where a period of time elapsed from the date and time of the start of usage of the service, which is to be displayed, is greater than a predetermined initial number of days, the CPU 11 determines that the valid displaying condition is not satisfied at S111. The predetermined initial number of days is an example of a second period of time.

In a case where none of above described conditions is not applicable, that is, when it is determined that the valid displaying condition is satisfied (S111:YES), the CPU 11 adds a valid notification to the notifying image at S112. The valid notification includes, for example, a notification indicating that the service is valid and a notification indicating a usage method of the service. Moreover, the CPU 11 counts up the number of displays of the valid notification at S113. The process performed at S113 is an example of a number-storing process. When it is determined that the valid displaying condition is not satisfied (S111:NO), the CPU 11 skips S112 and S113.

In a state in which the service is valid, displaying the valid notification of the service allows the user to recognize that user can use the service. If the valid notification is displayed every time when the user selects the printer 2, however, it is possible for the user to feel stress even if the valid notification is information related to the valid service. The supporting program 42 of the present embodiment determines whether the valid notification is to be added to the notifying image or not based on the valid displaying condition. As a result of this, there is low possibility that the same notification is repeatedly displayed many times, and the same notification is displayed so many times. Accordingly, it is possible to reduce the use's stress caused due to the situation in which the valid notification related to the service is displayed so many times.

Then, the CPU 11 obtains the remaining information of the service based on the service information 31, and the CPU 11 determines whether the remaining valid term or the remaining number of usable printings of the valid services is less than a predetermined term or less than a predetermined number of printings at S115. When it is determined that the remaining valid term is less than the predetermined term, or the remaining number of printings is less than the predetermined number of printings (S115:YES), the CPU 11 adds upgrade information to the notifying image at S116. The upgrade information is, for example, a notification indicating guidance such as the extension of the valid term of the service, the renewal of the service, the change of the usable number of printings, and the charging under the prepaid type plan.

The upgrade information may be, for example, an image including an object to which a link in which a URL indicating a web page that receives the procedures of the above described guidance is embedded is placed. In a case where the object to which the link in which the URL is embedded is placed is displayed, the user can easily access the web page indicated by the URL by operating the displayed object. Accordingly, it is possible to go through the procedures of the service based on the web page.

Moreover, in a case where the procedure application 201 (see FIG. 1) that receives the procedures of the upgrade related to the valid service and so on has been installed on the PC 1, the upgrade information added at S116 may be an image including an object associated with an activation command of the procedure application 201. In a case where the above described object is displayed, the user can easily activate the procedure application 201. It is possible to go through the procedures of the service by using the procedure application 201.

After S116 or when it is determined that the remaining valid term is equal to or greater than the predetermined term, or the remaining number of usable printings is equal to or greater than the predetermined number of printings (S115:NO), the CPU 11 adds a usage condition notification including information of the remaining valid term of the service or the remaining number of usable printings to the notifying image at S118. Since the usage condition of the printer 2 is notified to the user, it is possible for the user to recognize, for example, the remaining valid term or the remaining number of usable printings in the printer 2.

Figure 6:
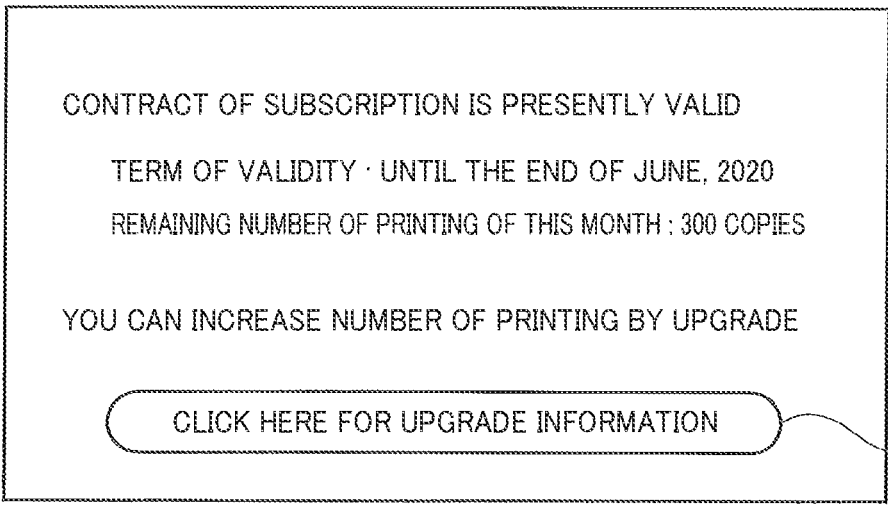
FIG. 6 is an explanatory view illustrating an example of a notifying image.

An example of the notifying image of the valid notification including the usage condition notification and the upgrade information is illustrated in FIG. 6. The valid notification of the example illustrated in FIG. 6 includes an object 61 to which a link in which a URL indicating a web page including the upgrade information is embedded is placed. The notifying image including the valid notification is displayed on the notifying area 52 in the print-setting screen D2. Accordingly, the user can easily grasp the status of the printer 2 and so on in the print-setting screen D2.

On the other hand, when it is determined that the printer 2 is the model to which none of the various kinds of services is applicable (S101: service not applicable), or when it is determined that none of the various kinds of services applicable to the printer 2 becomes valid (S103:NO), the CPU 11 determines whether a guidance displaying condition is satisfied or not at S121. The guidance displaying condition is a condition for determining whether a guidance notification indicating guidance of the service which is not currently used is to be included in the notifying image or not. The guidance displaying condition is determined based on, for example, the number of displays of the guidance notification or the period of time elapsed from the time of the last display of the guidance notification.

At S123, which will be described below, the supporting program 42 stores the number of displays of the guidance notification in the same manner as the case of the valid displaying condition. In a case where the number of displays of the guidance notification of the service, which is to be displayed, is greater than a predetermined limited number of displays, the CPU 11 determines that the guidance displaying condition is not satisfied at S121. In this case, the number of displays is an example of a total number of displays, and the predetermined limited number of displays is an example of a second value.

Moreover, in a case where the period of time elapsed from the time of the last display of the guidance notification is less than a predetermined interval time, the CPU 11 determines that the guidance displaying condition is not satisfied at S121 in the same manner as the case of the valid displaying condition. In this case, the predetermined interval time is an example of a first period of time.

When it is determined that the guidance displaying condition is satisfied (S121:YES), the CPU 11 adds the guidance notification to the notifying image at S122. The guidance notification of the service which is applicable to the printer 2 and does not become valid includes, for example, a notification indicating that the service becomes valid by a contract, a notification indicating a method of procedures for making the service valid, and a notification indicating a function available by the usage of the service. Moreover, in a case where there is no service applicable to the printer 2, the guidance notification includes, for example, a notification indicating information of another model to which the service is applicable, or a notification indicating a function available by the usage of the service. Moreover, the CPU 11 counts up the number of displays of the guidance notification at S123. The process performed at S123 is an example of a number storing process.

It is noted that, in a case where the server 200 and so on stand ready to provide a web page including information for making the service valid, the CPU 11 may add, to the notifying image, the guidance notification including an object to which a link in which a URL indicating the web page is embedded is placed.

Moreover, in a case where the above described procedure application 201 has a function of receiving the procedures for making the service valid, the CPU 11 may add, to the notifying image, the guidance notification including an object associated with an activation command of the procedure application 201 at S122. Moreover, in a case where the procedure application 201 is not installed on the PC 1, the CPU 11 may add, to the notifying image, the guidance notification including steps and a URL for downloading the procedure application 201.

Since the object associated with the activation command of the particular procedure application 201 which is capable of going through the procedures for making the service valid is displayed, the user can easily activate the procedure application 201, and the user can go through the procedures for making the service valid by using the procedure application 201. It is noted that a procedure application that receives the procedures for making the service valid may be a different application from a procedure application that receives procedures related to the valid service.

Figure 7:
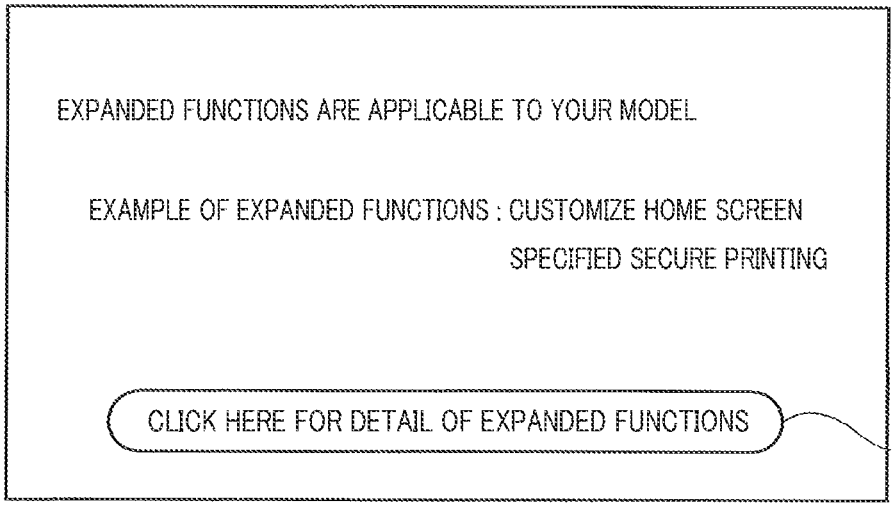
FIG. 7 is an explanatory view illustrating an example of a notifying image.

An example of the notifying image of the guidance notification including the service which is applicable to the printer 2 and does not become valid is displayed in FIG. 7. The guidance notification of the example illustrated in FIG. 7 includes information of an expanded function which becomes valid by the procedures and an object 62 to which a link in which a URL indicating a web page including the information of the expanded function is embedded is placed.

In a state in which the service applicable to the printer 2 does not become valid, displaying the guidance notification of the service allows the user to recognize that the user can make the service valid by the procedures. When the notifying image including the guidance notification is displayed on the notifying area 52 in the print-setting screen D2, there is high possibility that the user considers use of the notified expanded function. However, it is possible for the user to feel stress if the guidance related to the applicable service and the guidance of another model are displayed every time when the user selects the printer 2. The supporting program 42 of the present embodiment determines whether the guidance notification is to be added to the notifying image or not based on the guidance displaying condition. As a result of this, there is low possibility that the same notification is repeatedly displayed many times, and the same notification is displayed so many times. Accordingly, it is possible to reduce the use's stress caused due to the situation in which the guidance notification related to the service is displayed so many times.

After S118, after S123, or when it is determined that the guidance displaying condition is not satisfied (S121:NO), the CPU 11 determines whether a consumable displaying condition is satisfied or not at S131. The consumable displaying condition is a condition for determining whether a consumable notification including information related to a remaining amount of consumables is to be included in the notifying image or not. The supporting program 42 can obtain information related to a usage amount or the remaining amount of the consumables mounted on the printer, and information related to a timing of an exchange of the consumables or a method of the exchange of the consumables based on the service information 31 of the printer 2. For example, in a case where it is determined that the remaining amount of the consumables is less than a predetermined amount, the CPU 11 determines that the consumable displaying condition is satisfied.

When it is determined that the consumable displaying condition is satisfied (S131:YES), the CPU 11 adds the consumable notification to the notifying image at S132. The consumable notification is a notification that includes, for example, a notification of consumables, amounts of which are small, an object to which a link in which a URL indicating a web page for purchasing consumables is embedded is placed, and a notification for a method of an exchange of consumables. In this case, the exchange of consumables is notified to the user at a timing near to the timing when the consumables need to be exchanged. Accordingly, the user can recognize the timing of the exchange of the consumables. On the other hand, when it is determined that the consumable displaying condition is not satisfied (S131:NO), the CPU 11 does not add the consumable notification to the notifying image.

Figure 8:
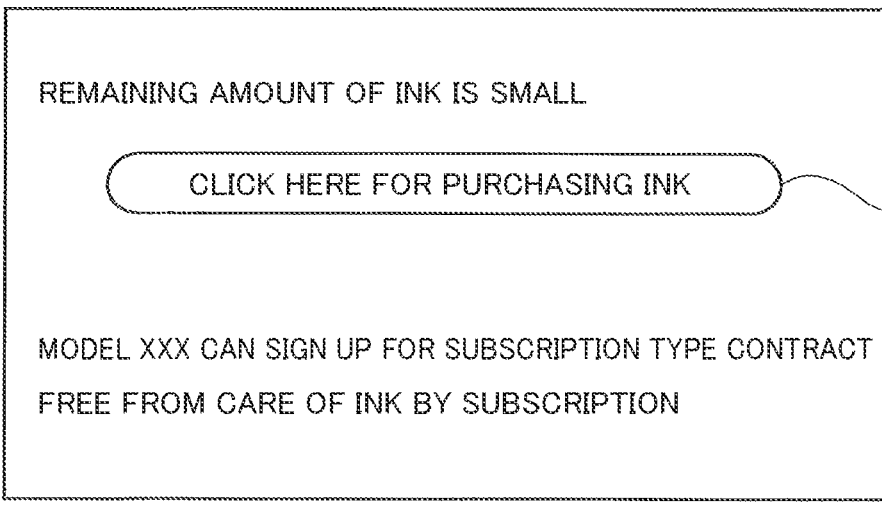
FIG. 8 is an explanatory view illustrating an example of a notifying image.

An example of the consumable notification of the notifying image displayed in a case where the service is not applicable to the model of the printer 2 and the remaining amount of ink is small is illustrated in FIG. 8. In the example in FIG. 8, the notifying image including the consumable notification, an object 63 to which a link in which a URL indicating a web page for purchasing ink is embedded is placed, and the guidance notification for guiding a model to which the service, which is not applicable to the printer 2, is applicable is illustrated. Since the notifying image including above described information is displayed on the notifying area 52 in the print-setting screen D2, the user can easily grasp the information related to the remaining amount of consumables.

It is noted that the supporting program 42 may notify the information of the consumables even when it is determined that the remaining amount of the consumables is not less than the predetermined amount. For example, the CPU 11 may notify the information of the consumables in a case where there is no notification to be displayed in the notifying image. In a case where information based on the usage amount of the consumables, for example, the remaining amount of the consumables, or the number of use of the consumables, the user can estimate, for example, the timing of the exchange of the consumables.

Next, at S141, the CPU 11 generates, based on the added notification, the notifying data indicating an image to be displayed on the notifying area 52. The process performed at S141 is an example of a generating process. In a case where a plurality of notifications are added to the notifying image, the CPU 11 may generate, for example, notifying data indicating a single notifying image in which all of the plurality of notifications, respectively illustrated in FIG. 6 to FIG. 8, of the added notifications are arranged, or the CPU 11 may generate notifying data indicating moving images in which a plurality of notifying images of the plurality of notifications are switched in order. Moreover, in a case where there are a large number of notifications to be displayed, the CPU 11 may not notify the low priority notifications. Moreover, in a case where there is no notification added to the notifying image, the CPU 11 may generate notifying data for making the notifying area 52 empty, or the CPU 11 may generate notifying data indicating a predetermined image such as a logotype of the vendor of the printer 2 and the latest information of the vendor.

It is noted that various kinds of messages indicating the notifications and information of the objects may be provided for the supporting program 42 in advance for each of the notifications. Or, the supporting program 42 may obtain the information related to the messages of the notifications or the information related to the objects from the printer 2 or the server 200.

As illustrated at A22 in FIG. 2, the CPU 11 passes the notifying data generated at S141 to the general-purpose printing program 41. As a result of this, at A23, the notifying image based on the notifying data is displayed on the notifying area 52 of the print-setting screen D2. That is, the image based on the notifying data generated by the supporting program 42 is displayed on the print-setting screen D2. At S142, the CPU 11 stores a date and time when the CPU 11 passes the notifying data to the general-purpose printing program 41, and the flow returns to the processes of the sequence in FIG. 2 after the CPU 11 ends the notifying data generating process. The process performed at S142 is an example of a date-and-time storing process.

It is noted that the supporting program 42 may display the information by itself instead of generating the notifying data and passing the generated notifying data to the general-purpose printing program 41. In this case, however, since another screen is also displayed on the display 13 in addition to the print-setting screen D2, there is a possibility that the complicated display causes stress on the user. To solve this problem, it is possible to reduce the user's stress by displaying said another screen in the print-setting screen D2 of the general-purpose printing program 41 of the OS 21 so as to achieve simple displaying.

Figure 9:
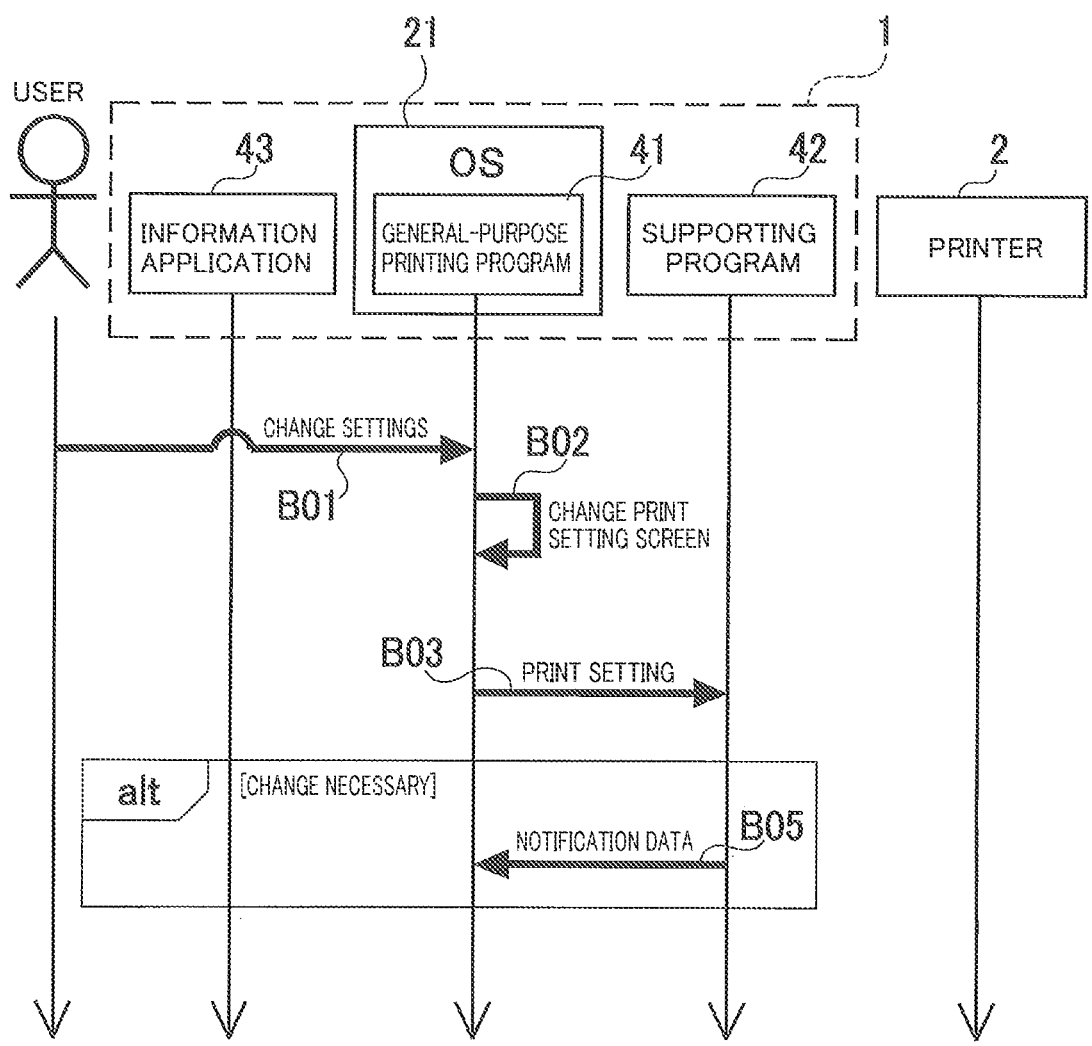
FIG. 9 is a view illustrating a sequence of steps performed in a case where an instruction for changing a print setting is received.

Next, there will be described steps of each of the programs performed in a case where an instruction for changing the print setting by operations of the user to the print setting column 53 is received while the print-setting screen D2 illustrated in FIG. 4 is displayed, with reference to a sequence in FIG. 9. It is noted that, as described above, the print-setting screen D2 can receive the instruction for changing the print setting by the operations to the print setting column 53 and an instruction for the print execution by operations to the printing button SW3.

The general-purpose printing program 41 receives the instruction for changing the print setting by the user at B01, and changes a displaying image displayed on the print setting column 53 in the print-setting screen D2 at B02. Further, in a case where the print setting is changed, the general-purpose printing program 41 activates the supporting program 42 and transmits to the printing program 41 a request for performing processes corresponding to the change of the print setting at B03. At B03, the supporting program 42 receives the information of the changed print setting from the general-purpose printing program 41.

The supporting program 42 determines, based on the changed print setting, whether there is a necessity to change the notifying data of the notifying image to be displayed on the notifying area 52 or not. When it is determined that there is the necessity to change the notifying data (alt: [change necessary]), the supporting program 42 generates the notifying data corresponding to the changed printing settings, passes the notifying data to the general-purpose printing program 41 at B05, and ends the processes.

For example, in a case where there is a large number of pieces of information which are determined to be notified in the notifying data generating process performed at A21 in FIG. 2, there is a possibility that the large number of pieces of information cannot be displayed on the notifying area 52 all together with at one time. In this case, the supporting program 42 may pass the notifying data including a part of the notifications to the general-purpose printing program 41 at A22, and may pass the notifying data including the remaining part of the notifications to the general-purpose printing program 41 at B05. It is noted that, when it is determined that there is no necessity to change the notifying data of the notifying image, the supporting program 42 notifies an end of the processes to the general-purpose printing program 41 without executing the process at B05.

Figure 10:
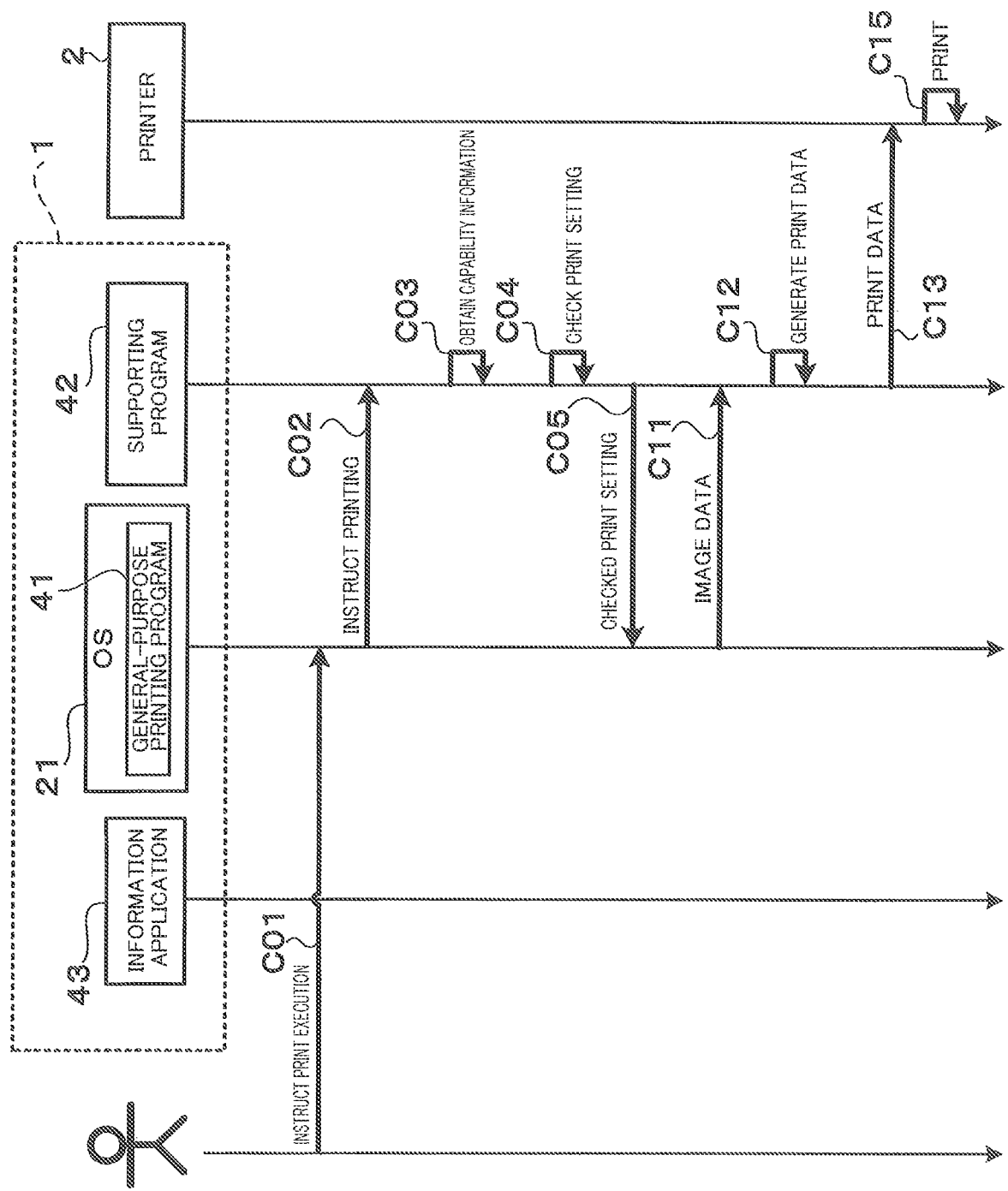
FIG. 10 is a view illustrating a sequence of steps performed in a case where an instruction for a print execution is received.

Next, there will be described steps of each of the programs performed in a case where the instruction for the print execution by the operations of the user to the printing button SW3 is received while the print-setting screen D2 illustrated in FIG. 4 is displayed, with reference to a sequence in FIG. 10. It is noted that the instruction for the print execution by the user may be directly inputted to the general-purpose printing program 41. The instruction for the print execution by the user may be inputted to the information application 43 and then may be outputted to the general-purpose printing program 41 from the information application 43.

The general-purpose printing program 41 activates the supporting program 42 based on the instruction for the print execution by the user at C01, and transmits to the supporting program 42 a request for performing processes corresponding to the instruction for the print execution at C02. At C02, the supporting program 42 receives, from the general-purpose printing program 41, the information related to the print setting which is being set at the time when the instruction for the print execution is received. The general-purpose printing program 41 may pass image data indicating an image to be printed to the supporting program 42. Moreover, the general-purpose printing program 41 closes the print-setting screen D2 which is being displayed. As a result of this, an information screen of the information application 43 becomes active.

The supporting program 42 receives the instruction for the print execution, and obtains, at C03, the capability information of the printer 2 stored at A14 in FIG. 2. It is noted that, at C03, the supporting program 42 may obtain the capability information of the printer 2 from the printer 2 by communicating with the printer 2. The capability information includes, for example, information of an image processing executable by the printer 2. At C04, the supporting program 42 checks the information of the print setting received at C02 based on the obtained capability information. At C04, the supporting program 42 checks, for example, whether a discrepancy between the print setting and the capability information of the printer 2 occurs or not. Further, the supporting program 42 passes the information of the print setting of the result of the check to the general-purpose printing program 41 at C05.

It is noted that the supporting program 42 may, at C05, change the print setting in accordance with the result of the check at C04 and may pass the changed print setting. For example, in a case where the information of the print setting received at C02 includes information of the particular image processing that is more preferable to be executed by the printer 2 than to be executed by the general-purpose printing program 41 or the supporting program 42, the supporting program 42 may change the print setting from the print setting including the particular image processing to the print setting not including the particular image processing. In this case, the supporting program 42 may store the information of the print setting, which is excluded, so as to pass the information of the print setting including the particular image processing to the printer 2 in a later step. At C05, the supporting program 42 may pass the information of the changed print setting to the general-purpose printing program 41.

The general-purpose printing program 41 generates the intermediate image data by converting a data format of the image data of the image to be displayed to a data format of intermediate image data by using the print setting received from the supporting program 42 and passes the generated intermediate image data to the supporting program 42 at C11. There are various kinds of formats of the image data included in the information application 43, and the general-purpose printing program 41 converts the image data of the image to be displayed to the intermediate image data suitable for generating the print data. It is noted that, in a case where the image data of the image to be displayed is data suitable for generating the print data, the image data itself may become the intermediate image data without being converted to the intermediate image data. The intermediate image data is, for example, XPS data.

At C12, the supporting program 42 rasterizes based on the intermediate image data received at C11 and generates the print data indicating the image to be displayed. The print data generated at C12 is data having a format usable in printing by the printer 2, for example, PDL data solely dedicated to the model of the printer 2.

Rasterizing by the supporting program 42 conforming to the printer 2 gives the printer 2 a large amount of flexibility and allows the printer 2 to generate the print data suitable for printing by the printer 2 when compared with rasterizing by the general-purpose printing program 41. It is noted that the print data generated by the supporting program 42 may be data having a format usable in printing by printers other than the model of the printer 2.

The supporting program 42 transmits, to the printer 2, the print data generated at C12 together with a printing command for instructing the print execution at C13. The process performed at C13 is an example of a transmitting process. In a case where there is the image processing which is determined to be executed by the printer 2 at C04, the supporting program 42 generates the printing command including information of the image processing. Further, the supporting program 42 may notify to the general-purpose printing program 41 that the transmission of the print data ends.

When receiving the print data and the printing command, the printer 2 performs printing an image of the print data based on the received printing command at C15. As a result of this, a printed object is generated.

It is noted that the general-purpose printing program 41 may generate the print data instead of the supporting program 42. For example, the supporting program 42 may pass the intermediate image data received at C11 and the information of the print execution to the general-purpose printing program 41, and the general-purpose printing program 41 may generate the print data by rasterizing the intermediate image data. In this case, the general-purpose printing program 41 passes the generated print data to the supporting program 42. Then, in a case where the supporting program 42 receives the print data from the general-purpose printing program 41, the supporting program 42 transmits, to the printer 2, the print data received from the general-purpose printing program 41 together with the printing command for instructing the print execution.

The print data generated by the general-purpose printing program 41 is print data having a format usable in printing by various kinds of printers, for example, PWGRaster data or PDF data. Rasterizing by the general-purpose printing program 41 allows the supporting program 42 to reduce an amount of processing. As a result of this, it is possible to reduce the processing time by the supporting program 42 and reduce the program size of the supporting program 42.

It is noted that the general-purpose printing program 41 may transmit the print data and the printing command to the printer 2. That is, the supporting program 42 may pass the generated print data to the general-purpose printing program 41 such that the print data is transmitted from the PC 1 to the printer 2 as the destination. In this case, the general-purpose printing program 41 transmits the print data received from the supporting program 42 and so on to the printer 2. In this case, the process in which the supporting program 42 passes the print data to the general-purpose printing program 41 and so on is an example of the transmitting process.

As described above in detail, the supporting program 42 of the present embodiment obtains, from the printer 2, the service information 31 which is the information related to the service applicable to the printer 2, and the supporting program 42 generates the notifying data based on the service information 31 and passes the notifying data to the general-purpose printing program 41. As a result of this, the image based on the notifying data is displayed on the notifying area 52 in the print-setting screen D2 by the general-purpose printing program 41. Accordingly, the user can recognize the information related to the service applicable to the printer 2 by the print-setting screen D2.

Moreover, since the supporting program 42 of the present embodiment determines whether the notification is to be added to the notifying image in accordance with the valid displaying condition and the guidance displaying condition, there is low possibility that the same notification is repeatedly displayed many times, and the same notification is displayed so many times. Accordingly, it is possible to reduce the use's stress. Moreover, since the supporting program 42 of the present embodiment notifies, as the information related to the valid service, the notification indicating that the service is valid, a notification indicating the usage conditions such as the valid usable term of the service, and the upgrade information in accordance with the conditions, there is high possibility that the information necessary for the user is notified. Moreover, since the supporting program 42 of the present embodiment notifies, as the information related to the not-valid service, the information of the service and the notification related to the procedures for making the service valid and so on in accordance with the conditions, there is a possibility that the user considers the use of the notified service.

It is noted that the embodiments disclosed in the present disclosure are merely described by way of examples, and do not limit the present disclosure. Accordingly, the technical features disclosed in the present disclosure may be embodied with various changes and modifications, which may occur to those skilled in the art, without departing from the spirit and scope of the disclosure. For example, the device connected on the PC 1 is not limited to the printer 2, and may be an apparatus having a printing function such as a multi-function peripheral, a copying apparatus, a facsimile apparatus. Moreover, a number of printers connected to the PC 1 is not limited to the example illustrated in drawings, may be two or more.

Moreover, for example, the notifying images illustrated in FIG. 6 to FIG. 8 are example, the notifying images are not limited to the examples illustrated in the drawings. Moreover, the text displayed in the notifying image, the shape of the object, and the background of the object may be changed as appropriate.

Moreover, in the present embodiment, it is determined a content of the notification to be added to the notifying image, or it is determined that the notification is to be added to the notifying image, based on the determination of whether the model of the printer 2 corresponds to the service or not, or whether the service is valid or not, or in accordance with the various kinds of conditions such as the valid displaying condition and the guidance displaying condition, however, these determination may be determined without considering the above described conditions. That is, the information related to the various kinds or services may be displayed regardless of the model of the printer 2 and the situations of the services.

Moreover, the general-purpose printing program 41 may activate the supporting program 42 in a case where the printer usually used in the OS 21 is switched from another printer to the printer 2 by operations of the user via the OS 21 after the print-setting screen D2 is displayed by the general-purpose printing program 41. In this case, the supporting program 42 may execute the notifying data generating process and may pass the notifying data to the general-purpose printing program 41, in the same manner as the case in which the printer 2 is selected.

Moreover, in the present embodiment, as the operations of the supporting program 42, only printing operations are described in detail, however, the supporting program 42 may have other functions. Moreover, the program executing the processes of the present embodiment is not limited to the supporting program 42, and the program may be a program that receives an instruction from the OS 21 or the general-purpose printing program 41 when executing printing by using the general-purpose printing program 41. For example, the program may be a printing workflow application what is called Print Workflow, the specification of which is published by Microsoft.

Moreover, the execution timing of the supporting program 42 is not limited to the example of the present embodiment. For example, the supporting program may be executed by a direct instruction for executing from the OS 21, or the supporting program 42 may be a resident program. In a case the supporting program is the resident program, the supporting program 42 may perform the above described operations when receiving an execution command.

Moreover, in the any flowcharts disclosed in the present embodiment, the execution order of the plurality of processes in the plurality of any steps may be changed or the plurality of processes may be executed in parallel, without causing a contradiction of the processes.

Moreover, the processes disclosed in the present embodiment may be executed by hardware such as a single CPU, a plurality of CPUs, an ASIC, and a combination of the CPU, the plurality of CPUs and the ASIC. Moreover, the processes disclosed in the present embodiment may be embodied by various kinds of embodiments such as a storage medium storing a program executing the processes and methods.

What is claimed is:

1. A non-transitory storage medium storing a supporting program executable by a computer of an information processing apparatus,
wherein the supporting program is configured to support a printing program of an operating system of the information processing apparatus, and the supporting program conforms to an external printer connected to the information processing apparatus,
wherein the printing program of the operating system is configured to process data so as to display a print setting screen on a display of the information processing apparatus,
wherein service information which is information related to a service applicable to the external printer is stored in the external printer,
wherein, when executed by the computer, the supporting program causes the information processing apparatus to execute:
when being requested from the printing program of the operating system for processing in response to selection of the external printer,
obtaining the service information stored in the external printer;
generating, based on the obtained service information, notification data indicating a notifying image to a user; and
displaying the notifying image on the print setting screen displayed on the display of the information processing apparatus by outputting the generated notification data to the printing program of the operating system before receiving an instruction for a print execution, to the printing program of the operating system, for causing the external printer to print an image.

2. The non-transitory storage medium according to claim 1,
wherein usage conditions related to the external printer are set to the service applied to the external printer,
wherein the service information stored in the external printer includes information indicating the usage conditions, and
wherein, in the generating, the notification data is generated based on the obtained service information such that the notifying image includes the usage conditions.

3. The non-transitory storage medium according to claim 1,
wherein the service information stored in the external printer includes information related to an amount of usage of consumables of the external printer, and
wherein, in the generating, based on the amount of usage of the consumables of the external printer included in the obtained service information, the notification data is generated such that the notifying image includes the information related to the amount of usage of the consumables.

4. The non-transitory storage medium according to claim 3,
wherein the generating comprises:
determining, based on the amount of usage of the consumables included in the obtained service information, whether there is a need for notifying an exchange of the consumables;
when it is determined that there is the need for notifying the exchange of the consumables, generating the notification data such that the notifying image includes information related to the exchange of the consumables; and
when it is determined that there is not the need for notifying the exchange of the consumables, generating the notification data such that the notifying image does not include the information related to the exchange of the consumables.

5. The non-transitory storage medium according to claim 1,
wherein the service information stored in the external printer includes information indicating whether the service is valid or not, and
wherein the generating comprises:
in a case where the obtained service information includes the information indicating that the service is valid, generating the notification data including information indicating that the external printer is presently using the service; and
in a case where the obtained service information does not include the information indicating that the service is valid, generating the notification data such that the notifying image includes guidance of the service.

6. The non-transitory storage medium according to claim 1,
wherein the service information stored in the external printer includes information indicating whether the service is valid or not, and
wherein, when being requested from the printing program of the operating system for processing in response to selection of the external printer,
in a case where the obtained service information does not include the information indicating that the service is valid, the notification data is generated in the generating such that the notifying image includes guidance of the service, and the notifying image is displayed on the display in the displaying based on the generated notification data.

7. The non-transitory storage medium according to claim 1,
wherein, in the generating, the notification data is generated based on the obtained service information such that the notifying image includes a link in which a URL indicating a web page including information related to a procedure of the service is embedded.

8. The non-transitory storage medium according to claim 1,
wherein, in the generating, based on the obtained service information, the notification data including an activate command of a particular application program installed on the information processing apparatus is generated, and
wherein the particular application program conforms to the service and has a function for receiving a procedure of the service.

9. The non-transitory storage medium according to claim 1,
wherein the service information stored in the external printer includes a total number of printings performed by the external printer, and
wherein, when being requested from the printing program of the operating system for processing in response to selection of the external printer,
in a case where the total number of printings included in the obtained service information is equal to or less than a first value, the notification data is generated in the generating, and, based on the generated notifying image, the notifying image is displayed on the display in the displaying.

10. The non-transitory storage medium according to claim 1,
wherein, when executed by the computer, the supporting program causes the information processing apparatus to store a total number of displays of guidance of the service displayed on the display based on the obtained service information, and
wherein, when being requested from the printing program of the operating system for processing in response to selection of the external printer,
in a case where the stored total number of displays is equal to or less than a second value, the notification data is generated in the generating, and, based on the generated notification data, the notifying image is displayed on the display in the displaying.

11. The non-transitory storage medium according to claim 1,
wherein, when executed by the computer, the supporting program causes the information processing apparatus to store a time of displaying the notifying image on the print setting screen, and
wherein, when being requested from the printing program of the operating system for processing in response to selection of the external printer,
in a case where a period of time elapsed from the latest stored time of displaying the notifying image is greater than a first period of time, the notification data is generated in the generating, and, based on the generated notification data, the notifying image is displayed on the display in the displaying.

12. The non-transitory storage medium according to claim 1,
   wherein the service information stored in the external printer includes information indicating a date and time of a start of usage of the service, and
   wherein, when being requested from the printing program of the operating system for processing in response to selection of the external printer,
      in a case where a period of time elapsed from the date and time included in the obtained service information is equal to or less than a second period of time, the notification data is generated in the generating, and, based on the generated notification data, the notifying image is displayed on the display in the displaying.

13. The non-transitory storage medium according to claim 1,
   wherein, when being requested from the printing program of the operating system for processing in response to receipt of the instruction for the print execution, that is outputted from an application program installed on the information processing apparatus to the printing program of the operating system, for causing the external printer to print an image, the supporting program causes the information processing apparatus to obtain image data indicating the image from the printing program of the operating system and transmit a printing command to the external printer based on the obtained image data.

* * * * *